Feb. 7, 1939.  E. J. ELLIS  2,146,111
BRAKE BEAM SAFETY SUPPORT
Original Filed June 3, 1937
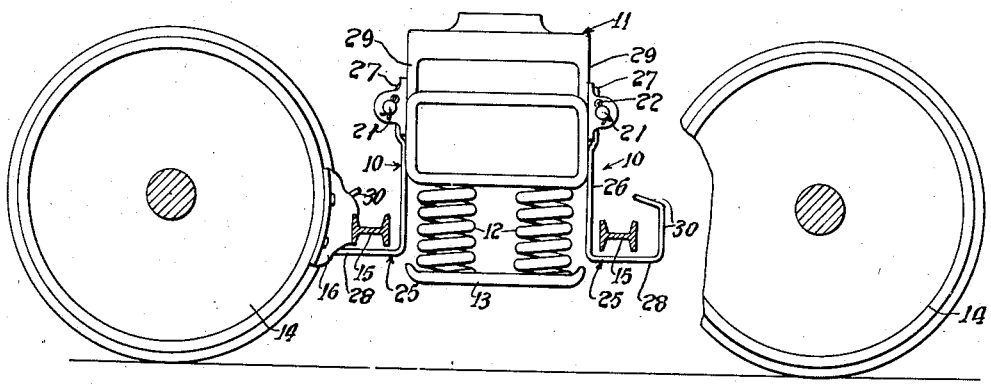
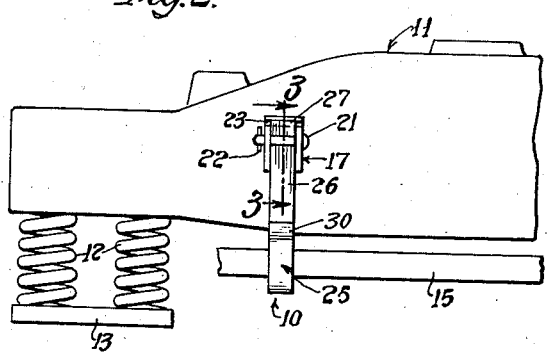
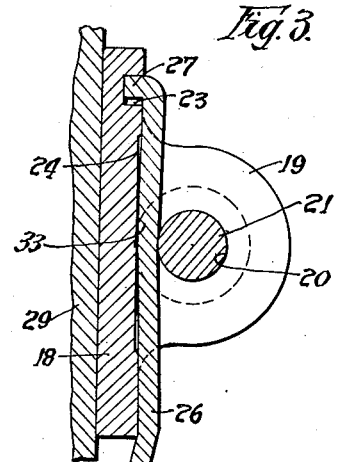
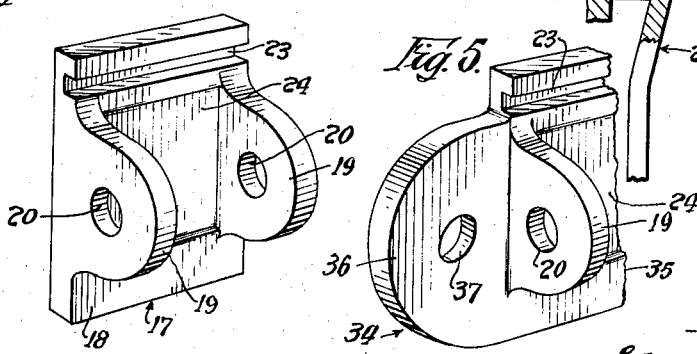
Inventor:
Edward J. Ellis,
By Charles B. Cannon
His Attorney.

Patented Feb. 7, 1939

2,146,111

UNITED STATES PATENT OFFICE 2,146,111

BRAKE BEAM SAFETY SUPPORT

Edward J. Ellis, Centralia, Ill.

Application June 3, 1937, Serial No. 146,236
Renewed December 19, 1938

4 Claims. (Cl. 188—210)

This invention relates to brake beam safety supports.

It is an object of this invention to provide an improved brake beam safety support which is relatively simple and inexpensive in construction and efficient in use.

Heretofore in the art of safety supports for the brake beams of railway cars it has been the practice, as is illustrated, for example, in Patent No. 2,038,373, granted to Jacob C. Lutz, April 21, 1936, to fasten the brake beam safety support to the wall of the bolster of the car truck frame by means of nuts and bolts. There are certain objections to this practice, however, and among these is the fact that when the brake beam safety supports are so fastened in position of use they are difficult to remove, when removal of the same is necessary, as, for example, when replacing the wheels of the car truck, because such nuts and bolts become rusted due to exposure to the weather and are exceedingly difficult to remove, and can be removed only by cutting the same, as by means of an acetylene torch or the like. This practice, however, not only makes the brake beam safety support difficult to remove but also destroys the bolts and hence is expensive and unsatisfactory both from the standpoint of time and labor and loss of materials involved.

I am also aware of the fact that other devices have been used for mounting brake beam safety supports on the bolsters of car truck frames and among these is the device shown in the Harris Patent No. 1,618,706. In so far as I am aware, however, none of these devices has been successful because, among other reasons, of the fact that when brake beam safety supports are held in position of use by means of nuts and bolts, or other devices used in the prior art, they become loose, due to vibration and shocks when in use, and hence will fall off from the car truck frame and thus cause a loss of the safety protection which they afford and hence increase the possibilities of derailment of the car caused by the brake rigging dragging on the ground, and which it is the function of a brake beam safety support to prevent.

Objects of the present invention, therefore, are: to provide an improved safety support for the brake beams of railway vehicles and which, when in use, will overcome the above-mentioned and other objectionable features of the prior art brake beam safety supports; which may be readily and easily installed in position of use and easily removed therefrom if and when necessary as, for example, when it is necessary to replace the wheels on the car truck, the brake beam, or the brake beam safety support itself; to construct the new brake beam safety support, including the mounting therefor, in such a manner that the hanger of the brake beam safety support is held under tension and hence will not vibrate or rattle when in use and therefore will not eventually become loose and fall off as in the prior art devices; to construct the same in such a manner that it is not necessary to invert the brake beam itself, that is, to turn the latter through 90°, in order to remove the brake beam, as in one of the prior art devices referred to above; and to provide a new and generally improved arrangement and device for mounting the new brake beam safety support upon the bolster of a car truck.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a view partly in section and partly in elevation, showing a pair of the new brake beam safety supports in position of use upon the frame of a railway car truck;

Fig. 2 is a fragmentary elevational view illustrating the manner in which the hanger of the new brake beam safety support is mounted upon the bolster of the car truck frame;

Fig. 3 is a vertical sectional view, on line 3—3 in Fig. 2, illustrating the manner in which the new brake beam safety support is mounted upon the bolster of a railway car truck frame and illustrating the manner in which the hanger of the new safety support is held under tension;

Fig. 4 is a perspective view illustrating one form of mounting bracket which is embodied in, and forms a part of the new brake beam safety support device and by means of which the hanger of the new brake beam safety support is mounted upon the bolster of a car truck frame; and Fig. 5 is a fragmentary perspective view illustrating a modified form of mounting bracket which may be used in place of the bracket which is shown in Fig. 4.

A preferred form of the new brake beam safety support device or unit is shown in Figs. 1 to 4, inclusive, of the drawing, is therein generally indicated at 10, and is shown in the environment in which it is used, namely, in conjunction with the bolster 11 of a railway car truck frame which includes the usual springs 12, spring plank 13, wheels 14, brake beams 15, and brake shoes, such as 16. It should be noted, in this connection, that only one brake shoe 16 is shown, and that the latter is shown in attached position; the other brake beam being 15 shown in section, back of the shoe, and the shoe being omitted and the corresponding wheel 14 being partially broken away, so as better to illustrate the construction of the present invention.

The new brake beam safety support 10 includes a metallic, and preferably steel, mounting bracket, which is generally indicated at 17 (Fig. 4), and this mounting bracket 17 includes a mounting plate or base 18 which in use may be attached to the vertical side wall 19 of the bolster 11 in any suitable manner, but is preferably secured to the same by welding, although it may, if desired, be secured to the bolster by means of rivets or other fastening elements or it may be formed integral with the bolster by being cast as a part of the same.

Formed integrally with the base or mounting plate 18 of the mounting bracket 17 is a pair of spaced projections or ears 19 each of which is provided with an opening or aperture 20, and these openings 20 are aligned, horizontally, for the reception of a wedging or retaining pin 21 which is secured in place therein by means of a cotter key 22 (Fig. 2).

Provided in the upper portion of the base or mounting plate 18 of the mounting bracket 17 is a horizontally extending recess or groove 23, and also provided in the front or outer surface of the base or mounting plate 18, between the ears 19, is a recess or dished out portion 24.

The new brake beam safety support or supporting unit includes a safety support bar or hanger 25 and which, in its preferred form, is substantially J-shaped in vertical section, and this hanger or bar 25 is preferably made of a good grade of slightly resilient metal, such as steel. This hanger or bar 25 includes a vertically and upwardly extending body portion 26, and this body portion 26 of the same terminates, at its upper end, in an inwardly extending angled end portion or lug 27 which, in use, projects into the slot or groove 23 which is formed in the base plate 18 of the mounting bracket 17. The bar 25 also includes a horizontally extending lower portion 28 which has an upward extending arm 30 which is directed toward the body portion 26 of the hanger 25, thus completing the substantially J-shaped formation of the same.

In the use of the new brake beam safety support the base plate 17 of the mounting bracket 17 may be made integral with or attached to the vertical side wall 19 of the car bolster 11 in any suitable manner, as by welding, and the hanger or bar 25 is arranged, as shown, with the vertically extending body portion 26 thereof disposed between the ears 19 of the mounting bracket 17, and with the angled upper end portion or lug 27 disposed in the slot or groove 23 of the same. The retaining or wedging pin 21 is then driven through the aligned openings 20 in the ears 19 and is secured in position by means of a cotter key 22.

It will be noted (Fig. 3) that the distance between the outer face of the recess or dished out front surface 24 of the base or mounting plate 18, and the inner side of the retaining or wedging pin 21, is such that when the retaining pin 21 is driven into position of use it bears or wedges against the outer or front surface of the body portion 26 of the hanger bar 25 and forces the same inwardly into the recess or dished out area 24 of the base plate 18, thus placing that portion 33 of the hanger bar 25 which extends across the recess or dished out area 24 of the mounting plate 18 under tension. Accordingly, when the bar 25 is thus mounted in position of use it is held under tension by the bearing action of the wedging or retaining pin 21 and hence is prevented from vibrating and rattling which cause excessive wear of the parts when the same are in use and hence eventual destruction or loss of the same and the consequent loss of protection against dropping of the brake beam rigging, and danger of resulting derailment of the car, which it is an object of the present invention to overcome; and which has been a difficulty experienced in the use of the prior art brake beam safety supports in which the hangers have not been held under tension when in position of use, as is the hanger 25 in the present invention.

It will also be noted that when it is necessary to remove the hanger or bar 25 from its position of use, as when removing or replacing the brake beams 15 or the wheels 14 of the car truck, or the hanger bar 25 itself, this may readily be accomplished by simply removing the cotter key 22 and then driving the wedging or retaining pin 21 out of the openings 20 in the ears 19, which may be accomplished by means of a punch and hammer, or other suitable tools, whereupon the bearing action or pressure of the pin 21 on the portion 33 of the bar 25, being thus relieved, the bar 25 will drop to the ground, so as to permit the brake beam 15 and wheels 14 to be replaced. It will be noted, in this connection, that the slot or groove 23 is made somewhat wider, considered vertically, than the angled upper end portion 27 of the bar 25, so that when the pressure of the wedging or retaining pin 21 on the hanger bar is removed the angled upper end portion 27 of the said hanger bar 25 will fall freely out of the slot or groove 23 and thus allow the hanger 25 to drop to the ground.

It will also be noted that the space between the upright body portion 26 of the bar 25 and the inner end of the extension or arm 30 is made somewhat greater than the horizontal width of the brake beam 15 so that when the wedging or retaining pin 21 is removed from its position of use the hanger bar 25 will drop freely to the ground, and past the brake beam, without necessitating that the brake beam 15 be turned through 90°, as is necessary in the use of the prior art brake beam safety support hereinbefore referred to.

It will be seen, therefore, from the foregoing description, taken in conjunction with the accompanying drawing, that the present invention provides a new brake beam safety support for the brake beams of railway cars and which may be readily installed in, and removed from, position of use; which is constructed in such a manner that when it is in position of use the hanger of the same is held under tension and hence will not vibrate or rattle and hence will not wear excessively and become loose and fall off and thus cause a loss of the aforesaid protection which it is the principal object of a brake beam safety support to afford; which may be mounted in position of use without the use of any nuts and bolts or other fastening elements which are apt to become rusted during use or necessitate that the same be cut out by means of a burning torch in order to remove the hanger bar, as is the case in the use of certain of the prior art brake beam safety supports; which does not necessitate that the brake beam be inverted or turned through 90° in order to remove the new brake beam safety support, as is necessary in the use of certain of the prior art brake beam safety supports hereinbefore referred to; which has the other advantages hereinbefore mentioned, and overcomes the other objectionable features of the prior art devices hereinbefore mentioned; and which accomplishes the objects of the present invention which have been stated hereinbefore.

While it is preferred that the mounting bracket embodied in the new brake beam safety support be attached to the side wall of the bolster 11 by welding, or that it be cast integral therewith, so that it will not vibrate and hence become worn when in use, it may, nevertheless, be attached to the bolster by means of conventional fastening elements such, for example, as screws or the like and a modified form of mounting bracket intended for this purpose is shown in Fig. 5, is generally indicated therein at 34, and includes a base plate 35 which is similar to the base plate 18 except that it is provided at each side thereof with an ear or extension 36 in which is provided an opening 37 through which a fastening element such, for example, as a screw, may be inserted so as to fasten the bracket 34 to the bolster 11.

It will also be noted that while the bolster 11 shown is of the type which embodies a spring plank 13 the present invention is not limited to use with such bolsters but may be used with those car bolsters which are now in use and do not embody a spring plank.

While I have illustrated and described the preferred form of construction for carrying my invention into effect, this is capable of variation and modification, without department from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A brake beam safety support device comprising a bracket including a plate adapted to be mounted on the bolster of a railway car truck frame, said plate having a groove formed therein on the outer surface thereof and adjacent the top of the same and also having a recess or dished-out portion formed therein on the outer surface thereof but below the said groove, said mounting bracket including a pair of ears formed integrally with the said plate on the outer surface thereof at opposite sides of the said recess and having aligned openings therein, a brake beam safety support bar having an angled upper end portion receivable in the said groove and including a slightly resilient portion adapted to be extended downwardly across the said recess and between the said ears, and a pin insertible into and through the said openings in the said ears and when therein bearing against the said slightly resilient portion of the said bar so as to urge the latter into the said recess and the said angled upper end portion of the said bar into the said groove so as to retain the said bar upon the said bracket and in position of use thereon.

2. A brake beam safety support device comprising a bracket including a plate adapted to be arranged on the bolster of a railway car truck frame, said plate having a slot or groove formed therein on the outer surface thereof and adjacent the top of the same and also having a recess or dished-out portion formed therein on the outer surface thereof but below the said groove, said mounting bracket including a pair of ears formed integrally with the said plate on the outer surface thereof at opposite sides of the said recess and having aligned openings therein, a substantially J-shaped brake beam safety support bar having an angled upper end portion receivable in the said groove and including a slightly resilient portion adapted to be extended downwardly across the said recess and between the said ears, and a pin insertible into and through the said openings in the said ears and when therein bearing against the said slightly resilient portion of the said bar so as to urge the latter into the said recess and the said angled upper end portion of the said bar into the said groove so as to retain the said bar upon the said bracket and in position of use thereon.

3. A brake beam safety support device comprising a bracket including a plate adapted to be mounted on the bolster of a railway car truck frame, said plate having a groove formed therein on the outer surface thereof and adjacent the top of the same and also having a recess or dished-out portion formed therein on the outer surface thereof but below the said groove, said mounting bracket including a pair of ears formed integrally with the said plate on the outer surface thereof at opposite sides of the said recess and having aligned openings therein, a brake beam safety support bar having an angled upper end portion receivable in the said groove and including a slightly resilient portion adapted to be extended downwardly across the said recess and between the said ears, and a pin insertible into and through the said openings in the said ears and when therein bearing against the said slightly resilient portion of the said bar so as to urge the latter into the said recess and the said angled upper end portion of the said bar into the said groove so as to retain the said bar upon the said bracket and under tension thereon.

4. A brake beam safety support device comprising a bracket including a plate adapted to be arranged on the bolster of a railway car truck frame, said plate having a slot or groove formed therein on the outer surface thereof and adjacent the top of the same and also having a recess or dished-out portion formed therein on the outer surface thereof but below the said groove, said mounting bracket including a pair of ears formed integrally with the said plate on the outer surface thereof at opposite sides of the said recess and having aligned openings therein, a substantially J-shaped brake beam safety support bar having an angled upper end portion receivable in the said groove and including a slightly resilient portion adapted to be extended downwardly across the said recess and between the said ears, and a pin insertible into and through the said openings in the said ears and when therein bearing against the said slightly resilient portion of the said bar so as to urge the latter into the said recess and the said angled upper end portion of the said bar into the said groove so as to retain the said bar upon the said bracket and under tension thereon.

EDWARD J. ELLIS.